United States Patent [19]
Birkenbach et al.

[11] Patent Number: 4,712,622
[45] Date of Patent: Dec. 15, 1987

[54] SELF-LEVELING AGRICULTURAL IMPLEMENT

[75] Inventors: Eugen J. Birkenbach, Kildeer; Brad K. Eversole, Bollingbrook; Kevin J. Magee, Romeoville, all of Ill.

[73] Assignee: J. I. Case Company, Racine, Wis.

[21] Appl. No.: 856,802

[22] Filed: Apr. 24, 1986

[51] Int. Cl.⁴ ............................................. A01B 63/111
[52] U.S. Cl. .................................... 172/328; 172/413
[58] Field of Search .............. 172/326, 327, 328, 413; 280/415.5

[56] References Cited

U.S. PATENT DOCUMENTS

| | | | |
|---|---|---|---|
| 2,717,479 | 9/1955 | Scheidenhelm | 172/328 |
| 2,840,971 | 7/1958 | Greeson | 172/328 |
| 2,970,656 | 2/1961 | Kampe | 172/328 X |
| 3,187,822 | 6/1965 | Clifford | 172/328 X |
| 3,202,225 | 8/1965 | Richardson | 172/328 |
| 3,480,085 | 11/1969 | Tilbury et al. | 172/328 |
| 4,450,917 | 5/1984 | Hake | 172/328 |
| 4,451,052 | 5/1984 | Gagelin | 172/413 |

Primary Examiner—Richard J. Johnson
Attorney, Agent, or Firm—Dressler, Goldsmith, Shore, Sutker & Milnamow, Ltd.

[57] ABSTRACT

A self-leveling agricultural implement is disclosed which has been particularly configured for maintaining the frame of the implement in a level disposition as it is raised and lowered by relative movement of its hydraulically-operated supporting wheels. The construction includes a pivotal draft hitch at a forward end of the implement frame, and a leveling linkage which operatively connects the draft hitch with a rockshaft of the implement which is operatively connected with its hydraulic actuators. Thus, as the actuators operate to relatively raise and lower the implement wheels, attendant rotation of the rockshaft acts to pivot the draft hitch relative to the frame, whereby the level disposition of the frame is maintained. The construction desirably includes an adjustable link which operatively connects the pivotal draft hitch with the leveling linkage, whereby the implement is readily adjustable for use with different tractors having differing drawbar heights.

3 Claims, 3 Drawing Figures

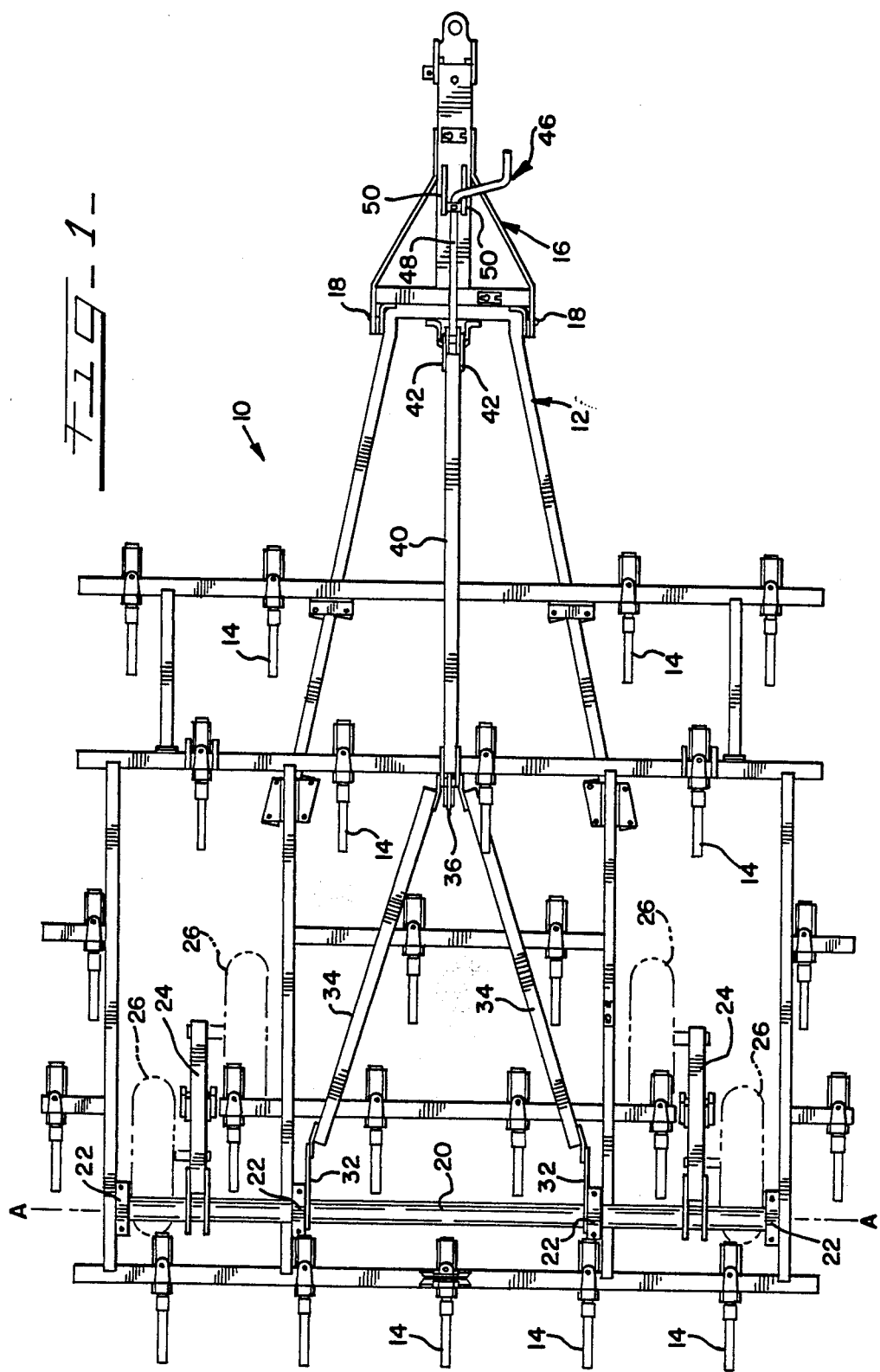

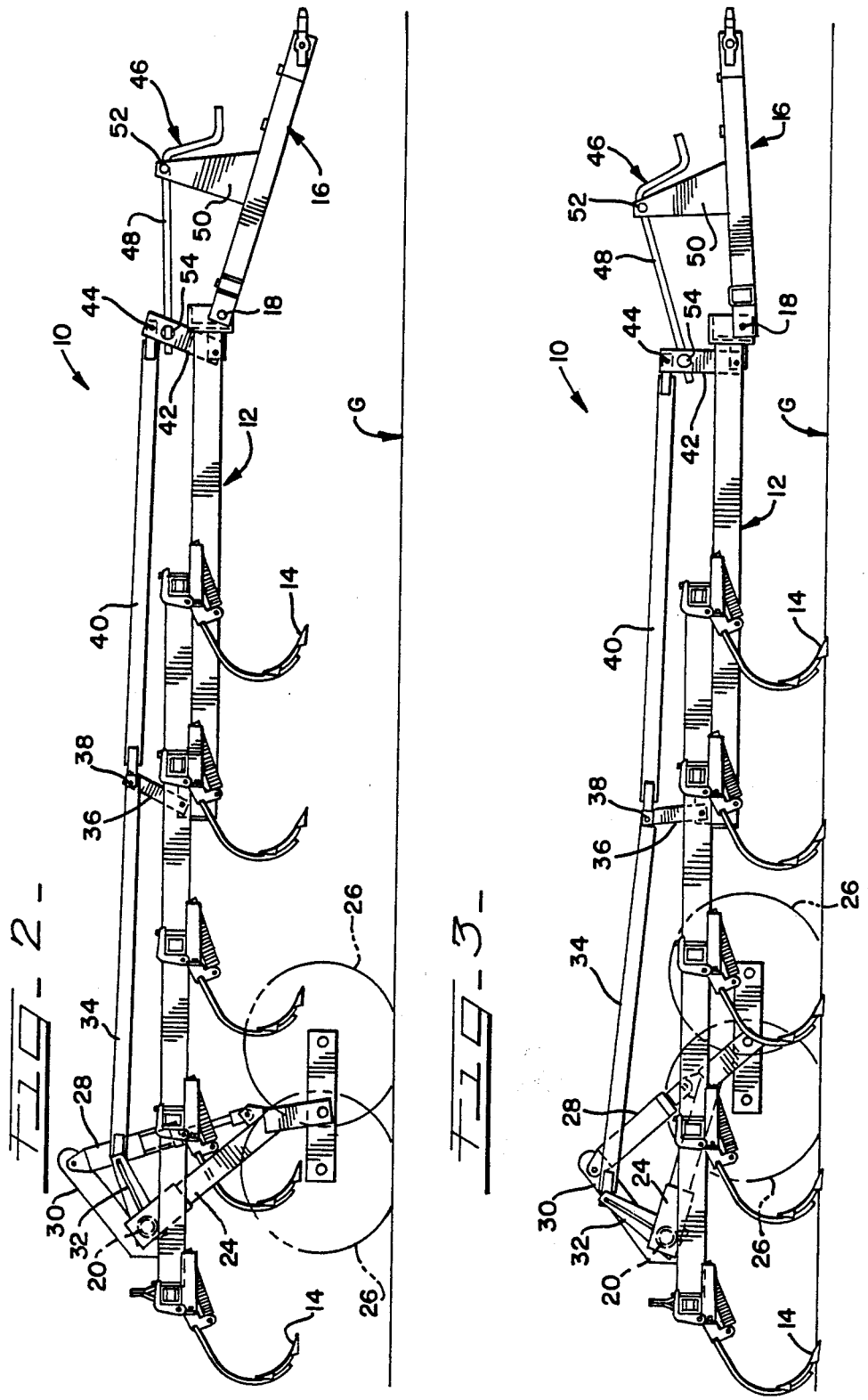

SELF-LEVELING AGRICULTURAL IMPLEMENT

TECHNICAL FIELD

The present invention relates generally to a wheeled agricultural implement adapted to be drawn behind an associated tractor, and more particularly to an implement including an adjustable leveling arrangement whereby the implement is maintained in a level disposition as it is raised and lowered relative to the ground.

BACKGROUND OF THE INVENTION

Efficient farming is promoted through the use of tractor-drawn agricultural implements configured to include a relatively large plurality of ground-working tools. By such arrangements, a relatively wide path of soil can be worked by each pass of the tractor, with the plurality of tools of such implements typically arranged to work a corresponding plurality of rows attendant to each pass.

While some agricultural implements include tools which are positioned generally in alignment transversely of the implement, it is not uncommon for an implement to have its tools arranged in both transversely and longitudinally spaced relation on the implement frame. As will be appreciated, efficient cultivation dictates that the implement frame be maintained in a relatively level disposition so that all of the tools, including those in the forward "rank" as well as those in the rearward "rank", penetrate the soil to a generally uniform depth.

Previous agricultural implement constructions have not promoted uniform depth control to the desired degree. In order to first adapt a typical implement for the drawbar height of the associated tractor (which height can typically vary from one tractor to another), it has heretofore been necessary to adjust the implement in a relatively inconvenient manner entailing repositioning the implement hitch with respect to a plurality of adjustment holes. While such adjustment can level the implement for a particular tool depth setting, such adjustment mechanisms are ordinarily configured such that the implement is maintained in a level disposition only at that one particular depth setting. In other words, while the tools of most implements can be raised and lowered by suitable hydraulic operation of an implement's supporting wheels, implements of the above type are not configured to be maintained in a level disposition throughout the range of this vertical tool movement.

Accordingly, it is desirable to provide an agricultural implement construction which is configured to be maintained in a level disposition attendant to raising and lowering of the implement relative to the ground, to thereby promote uniform depth control of ground-working tools mounted on the frame of the implement throughout the range of vertical movement of the tools. It is further desirable to provide an implement whereby it can be readily adjusted for use with tractors having implement drawbars mounted at differing heights above the ground.

SUMMARY OF THE INVENTION

The agricultural implement embodying the principles of the present invention has been particularly configured to promote uniform penetration of the ground-working tools mounted thereon, thereby promoting efficiency in crop cultivation. A desirably straightforward leveling linkage arrangement is provided which operatively connects the hydraulically-positioned wheels of the implement with a draft hitch pivotally mounted at the forward end of the implement. By this arrangement, the implement is maintained in a level disposition as it is raised and lowered relative to the ground. The present implement construction further includes an adjustable arrangement whereby the self-leveling linkage can be readily adjusted to permit use of the implement with tractors having drawbars at differing heights above the ground.

The self-leveling agricultural implement in accordance with the present invention includes a frame, and a plurality of ground-working tools mounted on the frame. A draft hitch is pivotally connected to the frame at a forward portion thereof, and is adapted for connection to the drawbar of a tractor.

In order to raise and lower the implement frame, and thus the ground-working tools, relative to the ground, a rockshaft is provided which is rotatably mounted generally on the rearward portion of the frame, and which extends transversely thereof. A pair of wheel arms are fixedly secured to the rockshaft, with at least one ground-engaging wheel rotatably mounted on a free end of each wheel arm. One or more double-acting hydraulic fluid actuators are provided which are operatively connected with the rockshaft for selective rotation thereof. In this manner, the ground-engaging wheels of the implement are moved generally vertically relative to the frame, thereby raising and lowering the frame relative to the ground. In this manner, the depth of penetration of the ground-working tools can be selectively varied.

In order to maintain the implement frame in a level disposition, a leveling linkage arrangement is provided which is operately connected to the implement rockshaft. The leveling linkage extends forwardly of the rockshaft, and notably, is positioned in spaced relation above the implement frame. By this construction, the leveling linkage is positioned so that it does not interfere with positioning of the ground-working tools on the frame; adjustable mounting of the tools is desirable to permit the implement to be used for cultivation of different crops (which may require different row spacing).

An adjustment link operatively connects the leveling linkage with the pivotal draft hitch of the implement. In the preferred form, the adjustment link comprises a manually-operable screw crank including a threaded shank portion, with the screw crank operatively connected with the leveling linkage by way of a pair of idler arms which support the leveling linkage above the frame for reciprocable movement. Notably, the idler arms which support the leveling linkage are arranged to substantially avoid stress-loading of the frame by the leveling linkage.

Other features and advantages of the present invention will become readily apparent from the following detailed description, the accompanying drawings, and the appended claims.

BRIEF DESCRIPTION OF THE DRAWINGS

FIG. 1 is a top plan view of a self-leveling agricultural implement embodying the principles of the present invention;

FIG. 2 is a side elevational view of the implement shown in FIG. 1, illustrating the implement in a relatively raised, so-called transport position; and FIG. 3 is a side elevational view similar to FIG. 2 illustrating the present agricultural implement in a relatively lowered, so-called working position.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference now to the drawings, therein is illustrated an agricultural implement 10 embodying the principles of the present invention. In many respects, implement 10 may be of conventional design, and accordingly includes a frame 12, which includes a plurality of generally transversely extending members upon which a plurality of ground-working tools 14 are adjustably mounted. Adjustable mounting of tools 14 facilitates use of implement 10 for cultivation of different crops, since the spacing between rows may vary according to the crop.

Implement 10 is configured to be drawn behind an associated tractor, and to this end, includes a draft hitch 16 generally at the forward end of frame 12. Notably, draft hitch 16 is pivotally connected to frame 12 generally at pivots 18. As will be further described, this pivotal mounting of the draft hitch 16 facilitates self-leveling and convenient adjustment of the present implement for use with different tractors having drawbars positioned at differing heights above the ground.

In order to raise and lower implement frame 12, and thus ground-working tools 14, relative to the ground, a generally elongated rockshaft 20 is provided which is rotatably mounted on the frame by pillow blocks 22 (shown only in FIG. 1). Rockshaft 20 is mounted generally at the rearward portion of the frame 12 and extends transversely thereof, and is rotatable about a horizontal axis A—A. At least one wheel arm 24 (and preferably a pair of wheel arms as illustrated) is fixedly secured to the rockshaft 20, with at least one wheel 26 mounted at the free end of the wheel arm. In the illustrated embodiment, a pair of wheels 26 are shown rotatably mounted generally at the free end of each wheel arm 24, with wheels 26 shown in phantom line for clarity.

In order to generally vertically move wheels 26 relative to frame 12, and thus raise and lower the frame relative to the ground G, one or more hydraulic actuators 28 are provided which are operatively connected with the rockshaft 20. More specifically, and as best illustrated in FIGS. 2 and 3, an actuator 28 is operatively connected with each of the wheel arms 24, with an opposite end of the actuator suitably operatively connected with implement frame 12 such as by an actuator anchor 30. It will be observed that actuators 28 and anchors 30 are not shown in FIG. 1 for purposes of clarity.

In accordance with the present invention, a leveling linkage arrangement is provided which operatively connects the rockshaft 20 with the pivotal draft hitch 16 at the forward end of implement frame 12. More specifically, a pair of crank arms 32 are fixedly secured to the rockshaft 20 at transversely spaced locations, with each crank arm 32 in turn respectively pivotally connected to one of a pair of first leveling links 34. As best illustrated in FIG. 1, first leveling links 34 extend forwardly of the rockshaft in converging relation to each other, with the first links 34 terminating generally at a first idler arm 36 pivotally connected to the implement frame 12, and extending upwardly from the frame 12 for supporting the leveling linkage arrangement above the frame.

The leveling linkage further comprises a second link 40 which is operatively connected to the forward ends of first links 36, and which extends forwardly thereof. As will be observed, idler arm 36 is pivotally connected with first links 34 and second link 40 generally at the connection of the first links to the second link.

Second link 40 extends forwardly of the implement frame, and is pivotally connected to a pair of second idler arms 42 positioned generally at the forward end of implement frame 12. Idler arms 42 are pivotally connected with the forward end of second link 40 by a suitable connector pin 44.

As will be appreciated by the components thus far described, rotation of rockshaft 20 by operation of hydraulic actuators 28 acts through-crank arms 32 to reciprocate first leveling links 34 and second leveling link 40 generally forwardly and rearwardly with respect to implement frame 12, with idler arms 36 and 42 desirably supporting the leveling linkage in spaced relation above the implement frame. In accordance with the present invention, implement 10 further includes an arrangement for operatively connecting pivotal draft hitch 16 with the leveling linkage, which such arrangement is desirably configured for adjustability, whereby the present implement is readily adaptable for use with tractor drawbars at differing heights.

To this end, an adjustment link comprising a screw crank 46 is provided, with the adjustment link including a threaded shank portion 48 which is manually rotatable by suitable operator manipulation of the screw crank. Adjustment link 48 is mounted on draft hitch 16 by a pair of mounting plates 50, with a pivot coupling 52 provided for rotatably supporting the adjustment link 46, and for permitting pivotal movement of the adjustment link with respect to the mounting plates 50.

The threaded shank portion 48 of the adjustment link is threadably and pivotally connected with the idler arms 42 by means of a threaded pivot coupling 54. Thus, it will be appreciated that idler arms 42 operatively connect the adjustment link 46 with the forward end of second leveling link 40. As will be further noted, the arrangement of idler arms 42, as well as idler arm 36, is such that stress-loading of the implement frame 12 by the leveling linkage is substantially avoided.

Operation of the present self-leveling implement will be readily appreciated from the foregoing description. The implement is prepared for use by manipulation of adjustment link 46 so that draft hitch 16 is pivoted relative to frame 12 to match the hitch to the drawbar height of the associated tractor. Adjustment of the link 46 is made such that implement frame 12 is level when the hitch 16 is attached to the tractor.

After this initial adjustment of the implement, the leveling linkage acts to maintain the implement frame 12 in a level disposition throughout the entire lift height and working range of the implement. Thus, as actuators 28 are operated to lower the implement frame generally from the raised, "transport" position shown in FIG. 2 to its "working" position shown in FIG. 3, leveling links 34 and 40 operate to pivot draft hitch 16 relative to implement frame 12, thereby maintaining the level disposition of the frame. As is evident from FIG. 3, level disposition of frame 12 promotes uniform depth control of the ground-working tools 14, thus desirably promoting efficient crop cultivation.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

What is claimed is:

1. A self-leveling argricultural implement, comprising:

a frame;

a plurality of ground-working tools mounted on said frame;

a draft hitch pivotally connected to said frame at a forward portion thereof;

a rockshaft rotatably mounted on said frame and extending transversely thereof;

at least one wheel arm fixedly secured to said rockshaft;

at least one ground-engaging wheel rotatably mounted on a free end of said wheel arm;

hydraulic actuator means operatively connected with said rockshaft for selective rotation thereof, whereby said ground-engaging wheel is moved generally vertically relative to said frame for raising and lowering said frame relative to the ground for selectively varying the depth of penetration of said ground-working rools;

leveling linkage means operatively connected to said rockshaft and extending forwardly thereof in spaced relation above said frams, said leveling linkage means comprising a pair of first leveling links each operatively connected to said rockshaft and extending forwardly thereof in converging relation each other, and further comprising a second leveling link operatively connected to forward ends of said first links and extending forwardly thereof, idler arm means supporting said leveling linkage means above said frame for reciprocable movement of said linkage means, said idler arm means being arranged to substantially avoid stress-loading of said frame by said leveling linkage means; and adjustment link means operatively connecting said draft hitch and said leveling linkage means, the forward end of said second link being operatively connected to said adjustment link means, said adjustment link means being adjustable to selectively pivot said draft hitch relative to said frame whereby said frame is in a level disposition when said draft hitch is connected to an associated tractor drawbar, said hitch thereafter being pivoted relative to said frame as said frame is raised and lowered by said hydraulic actuator means so that said frame is maintained in a level disposition.

2. A self-leveling agricultural implement in accordance with claim 1, wherein said idler arm means comprises at least one first idler arm pivotally connected to said frame and extending upwardly therefrom, said first idler arm being pivotally connected to said leveling linkage means generally at the connection of said first leveling links to said second leveling link, said idler arm means further comprising at least one second idler arm pivotally connected to said frame and extending upwardly therefrom, said second idler arm being pivotally connected to said leveling linkage means generally at the forward end of said second leveling link.

3. A self-leveling agricultural implement in accordance with claim 2, wherein said adjustment link means comprises a threaded shank portion and is mounted on said draft hitch for rotation of said shank portion and for pivotal movement relative to said hitch, said shank portion of said adjustment link means being threadably connected to said second idler arm so that said second idler arm operatively connects said adjustment link means to said second link of said leveling linkage means.

* * * * *